Oct. 11, 1955 W. F. KANNENBERG ET AL 2,720,630
ORIFICE COUPLING FOR HIGH Q CAVITIES
Filed Oct. 24, 1947 3 Sheets-Sheet 1
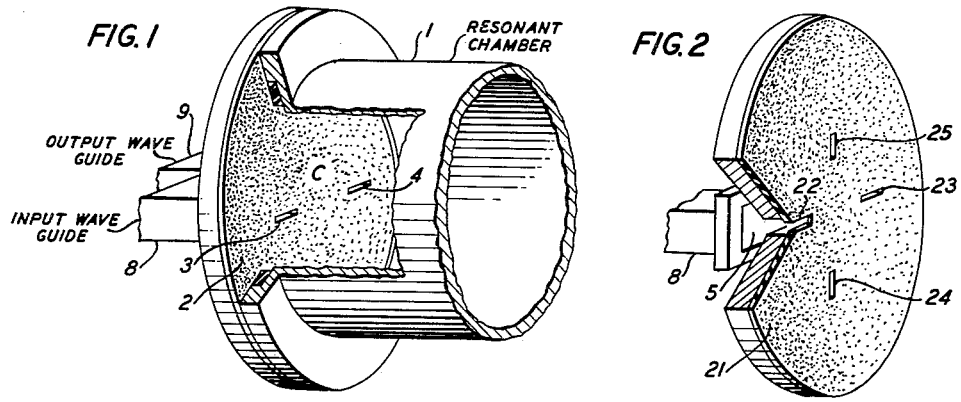
FIG. 1
FIG. 2
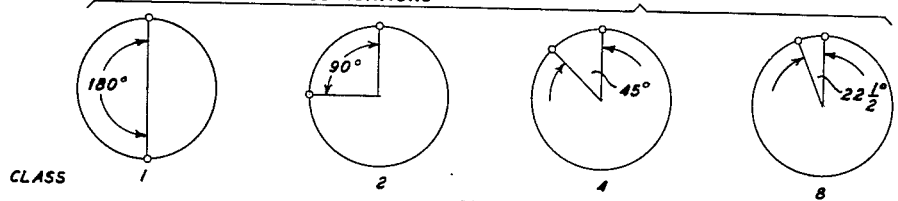
INTERMODE CANCELLING ORIFICE COMBINATIONS FIG. 3A
SPACING CLASSIFICATIONS
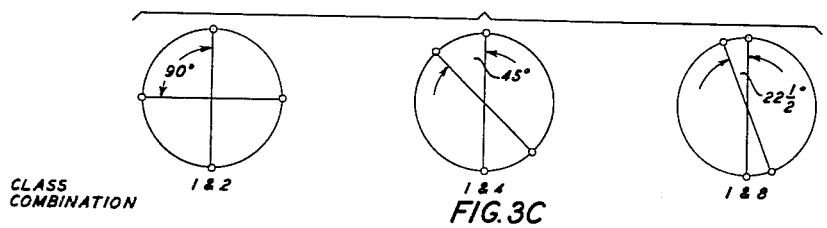
FIG. 3B
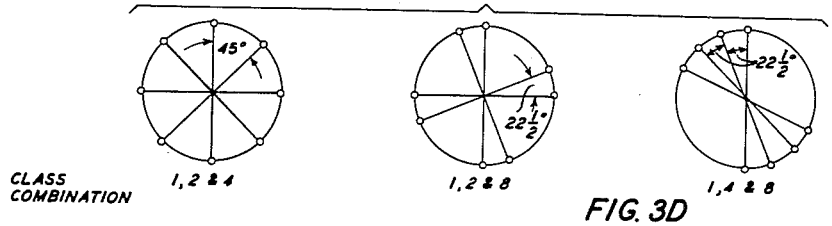
FIG. 3C
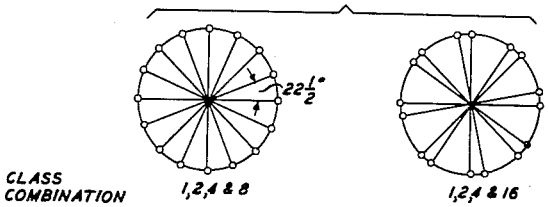
FIG. 3D
INVENTORS W. F. KANNENBERG
I. G. WILSON
BY
*N. D. Ewing*
ATTORNEY Oct. 11, 1955  W. F. KANNENBERG ET AL  2,720,630
ORIFICE COUPLING FOR HIGH Q CAVITIES
Filed Oct. 24, 1947  3 Sheets—Sheet 2

TE 3-2-4 MODE
CURRENT IN END PLATE PLOT
β = 0°, CURRENT IS TANGENTIAL
β = 30°, CURRENT IS RADIAL

RADIUS IN % OF MAX.—

INVENTORS  W. F. KANNENBERG
          I. G. WILSON
BY  N. D. Ewing
ATTORNEY

TE 2-2-8 MODE
CURRENT IN END PLATE PLOT
β = 0°, CURRENT IS TANGENTIAL
β = 45°, CURRENT IS RADIAL

United States Patent Office 2,720,630
Patented Oct. 11, 1955

2,720,630

ORIFICE COUPLING FOR HIGH Q CAVITIES

Walter F. Kannenberg, Gillette, N. J., and Ira G. Wilson, New York, N. Y., assignors to Bell Telephone Laboratories, Incorporated, New York, N. Y., a corporation of New York Application October 24, 1947, Serial No. 781,982

10 Claims. (Cl. 333—83)

This invention relates to cavity resonators and more particularly to mode suppression devices therefor.

An object of the invention is to cancel the intermode couplings for whole classes of extraneous modes within an electrical resonance chamber.

Another object of the invention is to phase the intermode couplings in a resonance chamber in such a manner as to cancel out undesired effects due to whole classes and subclasses of extraneous modes.

Still another object of the invention is to cancel the intermode couplings for whole classes and subclasses of extraneous modes, by arranging in proper relative phase relation groups of paired orifices such as slits or the like located in a resonance chamber.

A feature of the invention is an arrangement of paired, balanced orfices in a resonance chamber, phased so that the intermode couplings are suppressed for whole classes and subclasses of spurious modes.

Another feature of the invention is a single asymmetric wave energy feed and an arrangement of plural, balanced orifices such as slits or the like in a resonance chamber, with the individual pairs so relatively phased as to cancel the intermode couplings for entire classes and subclasses of extraneous modes.

Cavity resonators and particularly those of high Q are in general capable of supporting a large number of different modes of oscillation, either because of the frequency range they cover or because of their size. Thus at higher frequencies a cavity will support an increasing number of oscillation modes. Also at a given frequency a larger resonance chamber can likewise support more modes. Some of these modes are effective at frequencies which may be relatively remote from a desired predetermined mode of oscillation, such as the $TE_{01n}$ operating mode, so that they will not interfere therewith. Nevertheless, many modes are excited which are adjacent in frequency to the aforementioned operating mode or cross it on a mode chart. If such extraneous modes have sufficient intensity, they will prove troublesome either by providing ambiguous multiple responses or by robbing the desired mode of energy, thereby reducing its relative Q below the desired value.

Multiple feeds for resonance cavities have heretofore been disclosed in the United States application of J. C. Schelleng, Serial No. 580,517, filed March 2, 1945, which issued as United States Patent 2,453,760, November 16, 1948, wherein the symmetry and phasing of the feed orifices are so arranged as to discriminate in favor of the operating mode.

In accordance with the present invention, a resonance chamber is excited through a single feed orifice and auxiliary orifices without associated wave guide structures are so disposed in the walls of the chamber as to achieve intermode couplings that are equal and oppositely phased with relation to the coupling due to the feeding orifice.

In particular, relative enhancement of the desired mode of oscillation in a resonance chamber is attained by exciting the chamber at a single orifice thereof and providing a balancing orifice therefor, or by grouping pairs of balanced orifices and so relatively phasing the individual pairs as to produce the cancellation of couplings for whole classes and subclasses of extraneous modes. In one specific embodiment in accordance with the invention, a pair or pairs of balanced slits are provided in a resonance chamber, the geometrical arrangement and phasing thereof with respect to the electric field patterns of the extraneous modes being such as to cancel the intermode couplings due to the feeding orifice for whole classes and subclasses of spurious modes. The resonance chamber in this arrangement is fed with wave energy via a single orifice or slit only.

In this specification, transverse electric modes will be designated as TE modes and in the case of right circular, cylindrical resonators, the subscripts $l$, $m$, $n$ will hereinafter be used to refer respectively to the number of 360-degree phase changes circumferentially ($l$), 180-degree phase changes radially ($m$), and 180-degree phase changes longitudinally or axially ($n$). Hence $TE_{017}$ in a right circular cylinder describes an oscillation mode having a standing wave pattern such that its electric vectors are transverse to the cylinder axis; there is no change in phase circumferentially, i. e. $l=0$; there is a single half-wave change in phase radially $m=1$, and there are seven half-wave changes in the longitudinal or axial direction, $n=7$.

Referring to the figures of the drawing:

Fig. 1 shows a resonance chamber with a pair of balanced slits in the end plate thereof;

Fig. 2 shows an end plate construction with two pairs of balanced slits, 90 degrees apart;

Figs. 3A, 3B, 3C, 3D show various combinations of balanced orifices for cancelling classes and subclasses of intermode couplings.

Figure 4:
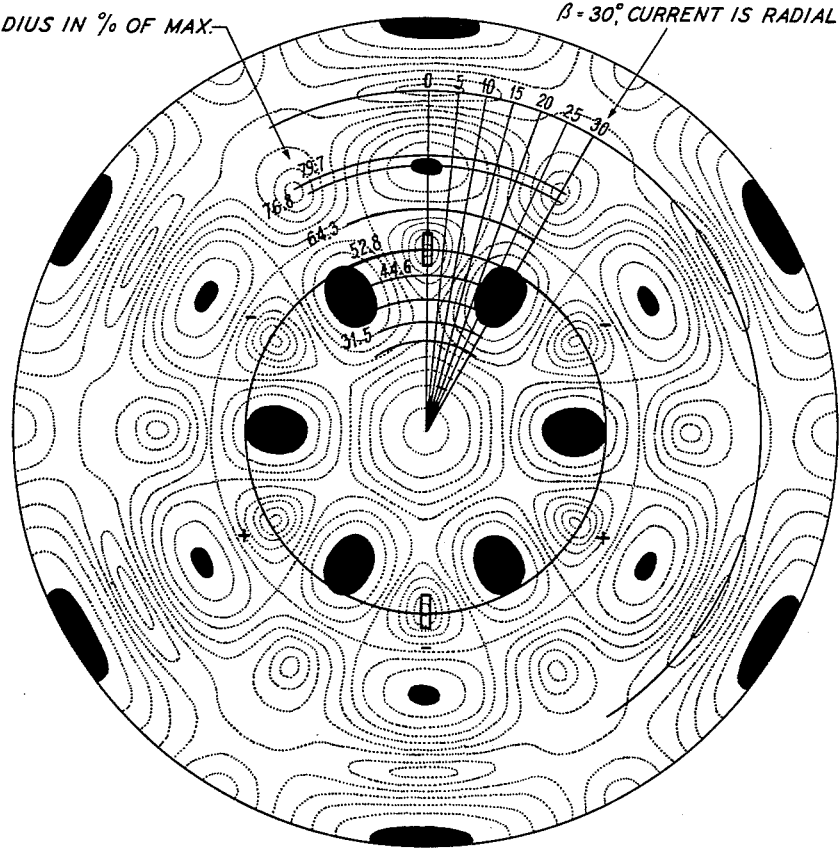
Figs. 4 and 5 show current distributions characteristic of representative $TE_{324}$ and $TE_{228}$ modes.

In ordinary filter circuits and networks, common impedance is a source of coupling between meshes. In resonant cavities of the wave guide art, there may exist many such common impedance couplings, which can couple the main mode and various spurious modes that can exist simultaneously in a cavity at a particular frequency.

Any orifice in the chamber walls oriented in a manner so as to couple to a given mode, loads the Q of that mode and thus may be represented both as a resistance and reactive element in the equivalent circuit. A second mode, provided the orientation permits coupling to it, is likewise loaded by the same orifice and a similar representation therefor applies. This then constitutes for the resonant cavity, the analog of the mutual impedance in plural meshes of ordinary coupled circuits.

Intermode coupling exists in a wave guide cavity or the like when there is energy transfer from one mode of oscillation to another. In high Q resonant cavities, such as echo boxes, intermode coupling results in a degradation of the desired performance characteristic of the operating mode.

If now the coupling impedance just described is represented in the analogous circuit by $R-jX$, and second impedance $R'+jX'$ is introduced in such a way that the $j$ components tend to cancel, then the intermode coupling will be reduced. Exact balance can be theoretically accomplished. It has been shown that the common impedances due to the R's does not give rise to undesirable effects.

It is our purpose to show how the appropriate sign of the balancing reactance can be provided by the proper spacial location of the orifices with respect to each other. This location takes into account the field configurations of the operating and extraneous modes.

Referring to Fig. 1, a resonant chamber 1 of right circular cylindrical form provided with a "supercharger" type of feed, more fully disclosed in the United States application of W. A. Edson-R. W. Lange, Serial No. 722,936, filed September 9, 1947, is shown, with the tuning piston end omitted. The conductive, silver-plated end wall 2 is provided with a pair of mode suppressing slits 3, 4 spaced 180 degrees apart and at a distance approximately equal to one-half R from the center C thereof, where R is the radius of the resonant chamber 1. The slit 3 is the energy input feed for the resonant chamber, to which an impedance matching transformer 5 of the "supercharger" type aforementioned is connected. The slit 4 may be left open to the atmosphere to operate largely as a passive reactance, or may be the output connection as disclosed in said W. A. Edson-R. W. Lange application. Other auxiliary wave guide components which may be associated with the resonance chamber are disclosed in said W. A. Edson-R. W. Lange application.

In lieu of narrow slits 3, 4 round orifices or dumb-bell shaped openings may be utilized in accordance with the principles of the present invention.

The resonance chamber 1 or echo-box cavity may be considered from a transmission standpoint and from a ringing response standpoint. Thus, a radar emits pulses of high-frequency energy. A cavity connected by a transmission path to the radar acquires a charge during the duration of each pulse of high-frequency energy and dissipates that acquired energy in the time interval between pulses at a rate inversely proportional to the loaded Q of the cavity. Both input and output orifices contribute to the loading of the cavity Q. Accordingly, the portion of stored energy not lost in internal cavity losses divides between these orifice paths, a portion returning to the radar receiver to furnish the "echo signal," the rest exciting the crystal and meter combination of the box.

Loading of a cavity by a given size of input or feed orifice depends on the latter's size, shape and location as well as the wall thickness. The mathematical and design relationships relating thereto are disclosed in an article by Wilson, Schramm and Kinzer entitled "High Q resonant cavities for microwave testing" published in Bell System Technical Journal, July 1946, pages 408–434. As disclosed in the latter article, the effect of varying orifice diameter on loading is very large, since the loading varies as the sixth power of the diameter. The loading effect also depends upon wave-guide dimensions and other factors, such as contributed by the associated wave-guide components and transducer structures disclosed in the aforementioned W. A. Edson et al. application.

Orifice loading is conditional on many factors in addition to orifice size and shape. When it becomes necessary to calculate the loading to other than the operating mode, it is well to keep in mind that circular orifices are inherently non-polarized, and therefore take on the polarization of the associated wave guide. Slit orifices show polarization of their own in proportion to the ratio of length to width. For achievement of the designed slit orifice loading it is therefore essential that slit and associated guide be properly aligned.

In the resonance chamber 1, the operating mode is the $TE_{01n}$ mode, which is characterized by a homogeneous and uniform field at any chosen radius R extending from the center of the end plate. The radius of maximum coupling thereto is approximately $$\frac{R}{2}$$

where R = the radius of the end plate. The electric field pattern for the $TE_{01n}$ mode and the patterns of other extraneous modes are disclosed in the Bell System Technical Journal, January 1947, pages 47–69 in an article entitled "End plate and side wall currents in circular cylinder cavity resonator" by J. P. Kinzer and I. G. Wilson.

In the case of the extraneous modes, where $l > 0$, the fields are not uniform but by definition of their $l$ index show $2l$ phase reversals around a complete circle at the radius of maximum coupling thereto.

Thus, in the case of the extraneous mode family $TE_{lmn}$, where $l = 1$, the arrangement of equally spaced orifices 3, 4, 180 degrees apart as shown in Fig. 1 will provide equal and opposite intermode couplings and thereby produce cancellation of this mode family. For most perfect balance, these orifices clearly should be alike in all pertinent respects so that the $j$ components are equal. However, for most practical applications this has not been necessary.

The cancellation by the single balanced pair (Fig. 1) is effective for all modes, characterized by $l$ = an odd integer, i. e. $l = 1, 3, 5, 7, 9, 11, 13, 15$, etc.

A small change in either the angle, the radius or the orifice size will change the intermode coupling. It follows that "equal and opposite" in the dimensional and geometrical sense is the simplest arrangement whereas in the electrical sense a shift in location compensated by a change in size may be equally satisfactory and permissible.

In the case of the extraneous mode family $TE_{2mn}$, where $l = 2$, it will be readily apparent that the 180-degree placement of a balancing orifice would fail to balance out the intermode couplings but would phase the couplings so as to make them additive. In this case, a 90-degree placement as in Fig. 3A between the orifices of a pair would achieve the desired cancellation, so that all modes characterized by $l = 2, 6, 10, 14, 18, 22$ would cancel out.

Orifice pairs have been arranged in classes, as illustrated in Fig. 3A–3D characterized by a 180-degree, 90-degree, 45-degree, 22½-degree, etc. angular separation, respectively. The mode families which are cancelled out by each class are tabulated in the following table:

Table.—Modes balanced out

| Class | Values of $l$ for which Positional Balance is Effective |
|---|---|
| 1 | 3, 5, 7, 9, 11, 13, 15, 17, 19, 21, 23, 25, 27, 29, 31, 33, 35, 37, 39 . . . (all odd numbers) |
| 2 | 2, 6, 10, 14, 18, 22, 26, 30, 34, 38, 42, 46, 50, 54, 58, 62 . . . |
| 4 | 4, 12, 20, 28, 36, 44, 52, 60 . . . |
| 8 | 8, 24, 40, 56 |
| 16 | 16, 48 |
| 32 | 32 |

Pairs of orifices may be grouped into composite patterns to cancel out corresponding classes. Thus Fig. 2 shows an end plate 21 for a resonance chamber (not shown), fed at a single opening 22 and having in all two pairs of 180-degree balanced orifices, namely 22, 23 and 24, 25. Note that 22 and 25, for example, are arranged 90 degrees apart as in class 2. The arrangement in this case serves to cancel out effectively the modes of classes 1 and 2.

This illustrates how to simultaneously satisfy intermode coupling balancing for a number of modes, such as would occur in broad band designs in the one centimeter band region as example.

In general the $l$ = odd modes are easily balanced, as 180-degree placement is satisfactory for all of them. But the $l$ = even modes do not lend themselves to such universality. The nearest approach to generality for these can be stated by saying that all even $l$ modes except multiples of 4 are satisfied by 90-degree placement.

Fig. 3B shows the placement of pairs of balanced orifices to cancel out simultaneously two classes of modes, to wit, class 1 and 2, class 1 and 4, class 1 and 8. Thus in the later case, namely, class 1 and 8, a pair of balanced orifices is displaced 22½ degrees to provide the location of a second pair. Orifices 180 degrees apart cancel class 1 modes, while orifices 22½ degrees apart cancel class 8 modes.

Fig. 3C shows the placement of pairs of balanced orifices for cancelling out simultaneously three classes of modes, namely, classes 1, 2 and 4, classes 1, 2 and 8, and classes 1, 4 and 8. Thus in the case of classes 1, 2 and 8, the class 1 and 2 pattern of Fig. 3B is displaced 22½ degrees to provide the Fig. 3C pattern of 4 pairs of orifices.

Fig. 3D shows the placement of pairs of balanced orifices, whereby four classes of modes, as indicated, may be simultaneously cancelled out.

Figure 4A:
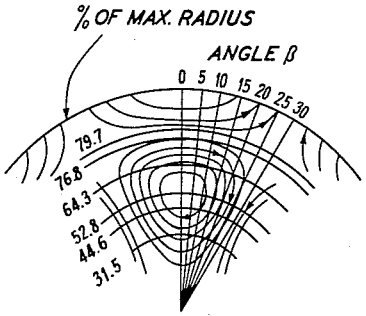
Figure 5:
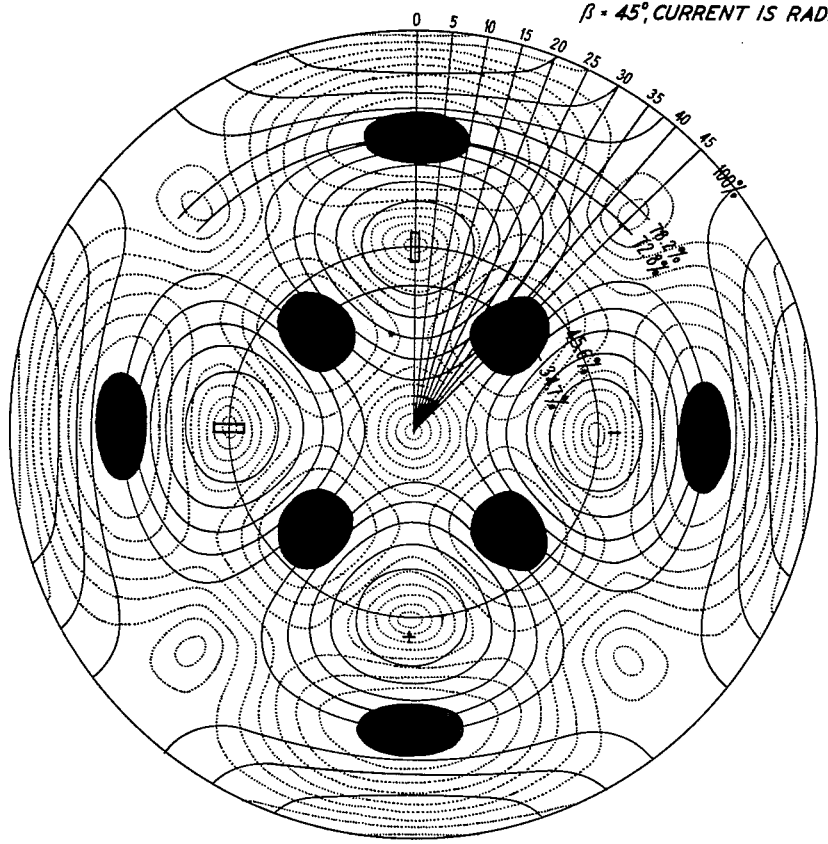

Figs. 4, 4A, 5 show the current distributions without shading representation for the $TE_{3,2,4}$ and $TE_{2,2,8}$ modes respectively. The detailed showing of shading proportional to the current density is illustrated in the Bell System Technical Journal, January 1947, pages 50 to 52, aforementioned.

Experimental work demonstrates that intermode couplings produced by an input orifice can be balanced out by proper placement of a second or balancing orifice. As a typical example thereof, Figs. 4 and 5 illustrate effective balancing locations of orifices for a $TE_{3,2,4}$ and $TE_{2,2,8}$ mode crossing with the $TE_{0,1,12}$ operating mode as the displacement angle between orifies is varied from 0 degrees to 360 degrees. It is found that at balance points the interference between the wanted $TE_{0,1,12}$ and the interfering modes is practically non-existent. When intermode couplings for different mode families or classes are to be simultaneously cancelled, a compositing arrangement of orifices may be necessary as previously summarized in the table and illustrated in Figs. 3A–3D.

The locations for balancing the $TE_{2,2,8}$ obviously do not coincide with those for the $TE_{3,2,4}$, which demonstrates that the requirements for each crossing mode must be simultaneously and separately satisfied. This can in general be done by providing balancing orifices as prescribed in Figs. 3A–3D. In particular, the arrangement of orifices shown in Fig. 2 will cancel both $TE_{2,2,8}$ and $TE_{3,2,4}$ intermode couplings.

Also intermode couplings due to cavity distortion, such as lack of perfect geometry and tilt of piston may likewise be cancelled by a balancing orifice or orifice combinations or the like.

The orifice spacing patterns of Figs. 3A, 3B, 3C, 3D for end feed, locate the balancing orifices on the same circle on which lies the orifice whose intermode coupling is to be balanced out. This, for the given locations, gives points of equal coupling effectiveness, and therefore offers a simple balancing solution. It should be apparent that at other locations along a radius of maximum tangential coupling to the interfering mode the phase may reverse. Thus as shown in Fig. 4A, had the orifices been situated at greater than 53 per cent radius locations, the phases of the intermode couplings would have been reversed. Had the orifice location been at the 52.8 per cent radius for the $TE_{3,2,4}$ case and at 45.6 per cent for the $TE_{2,2,8}$ case, these intermode couplings due to the orifice would have been absent. Thus trouble from at least one of a series of mode crossings could be eliminated by modifying the radius of end feed location.

It should be understood that the patterns of Figs. 3A–3D are equally applicable to side feed spacings for perfect cancellation of classes and subclasses of extraneous modes.

A combination of end feed and side feed balances is also possible, but it is more difficult to design proper orifices at other than geometrically symmetrical locations (which by field pattern symmetry have equal and opposite intermode couplings) to achieve equal magnitude and opposite phase precisely.

It should be understood that the principles underlying the classifications of the table are applicable to various structures, giving rise to intermode couplings in a resonance chamber, other than orifices and slits heretofore disclosed in such as coupling loops and probes. Other shapes than the circular cylinder may be used for the purposes of this invention.

What is claimed is:

1. In combination, an electrical cavity resonator of cylindrical form having a circular end wall, means for feeding wave energy to said chamber at one point thereof located at a half radius distance from the center of said end wall, to excite a $TE_{01n}$ desired mode, and a coupling means balanced with respect to said feed point and adapted to cancel intermode couplings for a family of $TE_{lmn}$ modes, where $l$ represents the odd integers 1, 3, 5, 7, 9, etc. said coupling means being equispaced electrically from said center and displaced 180 degrees from said feed point to provide an opopsed intermode coupling impedance in said resonator.

2. In combination, a high Q cavity resonator, means for exiciting a desired $TE_{01n}$ electromagnetic mode of oscillation therein, and unexcited, passive intermode coupling impedance means located on a circle having as center a point of zero field strength for said mode, the angular separation between said points being a fraction $$\frac{\pi}{a}$$

where $a$ is an integer 1, 2, 4, 8, 16, etc., to thereby cancel a family of $TE_{lmn}$ modes.

3. The structure of claim 2, and pairs of balanced orifices symmetrically disposed on a common circle, said orifices being outlets for wave energy in said resonator whereby $TE_{lmn}$ modes are canceled, $l$ representing all even integers excluding multiples of 4.

4. In combination, a high Q cavity resonator having a longitudinal axis and circular symmetry about said axis, a plurality of slits therein located at points having equal radii and equiangularly spaced apart, one thereof being an input feed for exciting a desired $TE_{01n}$ mode, another being an intermode coupling slit balanced electrically with respect to said feed slit, and the remaining slits being unexcited, passive impedances balanced in pairs and spaced apart an angular distance $$\frac{\pi}{a}$$

where $a$ is an integer 1, 2, 4, 8, 16, etc., whereby families of extraneous modes are suppressed.

5. In combination, a cylindrical cavity resonator having a circular end wall provided with radial slits, said slits being symmetrically disposed on a common circle, a waveguide feed coupled to one of said slits for exciting a desired $TE_{01}$ mode in said resonator, the remaining slits being unexcited and constituting passive impedances for cancelling intermode couplings, pairs of said remaining slits being on opposite sides of and equispaced electrically from the center of said end wall and being located in regions of opposing polarity with respect to an undesired $TE_{omn}$ mode field pattern.

6. In combination, a tunable cavity resonator having a circular end wall provided with four radial slits, symmetrically disposed on a common circle, a wave-guide feed coupled to only one of said slits at a half-radius distance from the center of said end wall, to excite a $TE_{01n}$ mode in said resonator, the remaining slits being unexcited and constituting passive impedances, one thereof being balanced with respect to said feed at a position of opposing polarity to cancel intermode coupling for $TE_{lmn}$ modes, where $l=$ an odd integer and the other pair of slits being mutually balanced at positions of opposing current polarity to cancel $TE_{l',m',n'}$ modes, where $l'=$an even integer representing the circumferential index of the mode.

7. In combination, a high Q cavity resonator of cylindrical form having a circular end wall, said wall having a wave energy feed slit for exciting a $TE_{01n}$ operating mode in said cavity at a position of maximum field strength of said mode, and a plurality of unexcited slits spaced apart on a circle corresponding to the $TE_{01n}$ mode lines of force of high intensity, one of said slits being colinear with an 180 degrees away from said feed slit, the remainder of the slits being arranged in balanced pairs providing passive coupling impedance so phased as to cancel intermode couplings, said balanced pairs serving to cancel $TE_{lmn}$ mode families, where $l$ is an even integer representing the circumferential index of the mode.

8. A wave guide of cylindrical form having a conductive end wall, said wall having a feed slit for exciting a $TE_{01n}$ operating mode at a position of maximum field strength of the $TE_{01n}$ mode, and an intermode coupling impedance comprising an output slit spaced 90 degrees from the first slit and located in a position of corresponding maximum field strength for $TE_{01n}$ mode, whereby to cancel extraneous $TE_{lmn}$ modes, where $l>1$.

9. A high Q cavity resonator comprising a cylindrical chamber having an end wall movably mounted for tuning the resonator and another end wall having slits therethrough extending in radial directions at positions where a $TE_{01n}$ mode is excited as an operating mode, one of said slits connected to a wave guide, some of the other slits being balanced to cancel undesired $TE_{lmn}$ modes.

10. A wave guide having an end wall, said wall having a radial slit located at a position of maximum field strength for a $TE_{01n}$ mode, an energy feed line connected to said slit, and a radial slit similarly located in said end wall to provide a passive impedance and phased to cancel intermode couplings, whereby undesired $TE_{lmn}$ modes are suppressed.

References Cited in the file of this patent

UNITED STATES PATENTS

| Number | Name | Date |
|---|---|---|
| 2,439,388 | Hansen | Apr. 13, 1948 |
| 2,453,760 | Schelleng | Nov. 16, 1948 |
| 2,455,158 | Bradley | Nov. 30, 1948 |
| 2,466,439 | Kannenberg | Apr. 5, 1949 |
| 2,587,055 | Marshall | Feb. 26, 1952 |
| 2,593,095 | Brehm | Apr. 15, 1952 |
| 2,593,155 | Kinzer | Apr. 15, 1952 |
| 2,593,234 | Wilson | Apr. 15, 1952 |